United States Patent
Fujiwara et al.

(10) Patent No.: US 9,141,057 B2
(45) Date of Patent: Sep. 22, 2015

(54) SWITCHING CONTROL APPARATUS AND IMAGE FORMING APPARATUS

(71) Applicant: CANON KABUSHIKI KAISHA, Tokyo (JP)

(72) Inventors: Yuji Fujiwara, Susono (JP); Fumiaki Mizuno, Suntou-gun (JP); Yuka Fukasawa, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 66 days.

(21) Appl. No.: 14/268,714

(22) Filed: May 2, 2014

(65) Prior Publication Data

US 2014/0341603 A1 Nov. 20, 2014

(30) Foreign Application Priority Data

May 17, 2013 (JP) ................................. 2013-105116

(51) Int. Cl.
| | |
|---|---|
| G03G 15/00 | (2006.01) |
| H02M 1/08 | (2006.01) |
| H02M 5/257 | (2006.01) |
| H02M 1/00 | (2007.01) |

(52) U.S. Cl.
CPC ........... *G03G 15/5004* (2013.01); *H02M 1/081* (2013.01); *H02M 5/2573* (2013.01); *H02M 2001/0006* (2013.01); *H02M 2001/0032* (2013.01); *Y02B 70/16* (2013.01); *Y10T 307/74* (2015.04)

(58) Field of Classification Search
CPC ........... G03G 15/5004; H02M 5/2573; H02M 2001/0006; H02M 2001/0032; Y02B 70/16
See application file for complete search history.

(56) References Cited

U.S. PATENT DOCUMENTS

| | | | | |
|---|---|---|---|---|
| 5,331,354 A | * | 7/1994 | Koyama et al. | 348/730 |
| 5,448,448 A | | 9/1995 | Fujiwara et al. | |
| 5,812,386 A | * | 9/1998 | Youn | 363/86 |
| 5,920,466 A | * | 7/1999 | Hirahara | 363/21.02 |
| 5,995,388 A | * | 11/1999 | Preller | 363/21.15 |
| 6,188,584 B1 | * | 2/2001 | Arai et al. | 363/16 |
| 6,307,762 B1 | * | 10/2001 | Shiobara | 363/69 |
| 6,316,844 B1 | * | 11/2001 | Arima | 307/65 |
| 6,408,148 B1 | * | 6/2002 | Yamamoto | 399/88 |
| 6,515,379 B1 | * | 2/2003 | Nojima et al. | 307/64 |
| 8,837,976 B2 | * | 9/2014 | Kato et al. | 399/88 |
| 2001/0010639 A1 | * | 8/2001 | Shirato et al. | 363/89 |

(Continued)

FOREIGN PATENT DOCUMENTS

JP  2009-207241 A  9/2009

*Primary Examiner* — G.M. Hyder (74) *Attorney, Agent, or Firm* — Fitzpatrick, Cella, Harper & Scinto (57) ABSTRACT

The switching control apparatus includes a switching driving unit for turning on and off the switch, a control-purpose power supply for outputting electric power, a power transmission unit provided between the switching driving unit and the control-purpose power supply, for supplying or cutting off electric power from the control-purpose power supply to the switching driving unit, and a control unit for controlling the power transmission unit. The control unit controls the switching driving unit to turn the switch on or off, during a period in which the electric power from the power supply to the switching driving unit is cut off by the power transmission unit, or supplied from the power supply to the switching driving unit.

20 Claims, 5 Drawing Sheets

(56) References Cited

U.S. PATENT DOCUMENTS

| | | |
|---|---|---|
| 2001/0012210 A1* | 8/2001 | Nagai et al. .................... 363/98 |
| 2001/0055216 A1* | 12/2001 | Shirato ...................... 363/21.07 |
| 2002/0131788 A1* | 9/2002 | Nakaya .......................... 399/88 |
| 2006/0023477 A1* | 2/2006 | Lee ................................ 363/65 |
| 2009/0027929 A1* | 1/2009 | Kim et al. ...................... 363/65 |
| 2011/0316352 A1 | 12/2011 | Kubo et al. |
| 2012/0092897 A1* | 4/2012 | Hara et al. ...................... 363/16 |
| 2013/0166926 A1* | 6/2013 | Yamamizu ................... 713/300 |

* cited by examiner

SWITCHING CONTROL APPARATUS AND IMAGE FORMING APPARATUS

BACKGROUND OF THE INVENTION

1. Field of the Invention

The present invention relates to a switching control apparatus configured to control a switch for supplying or cutting off electric power from a commercial alternating current power supply to a predetermined load, and to an image forming apparatus using the switching control apparatus.

2. Description of the Related Art

A thyristor and a gate-controlled semiconductor switch (generally known as TRIAC (trademark) and hereinafter simply referred to as TRIAC) are known as a switch for supplying or cutting off electric power from a commercial alternating current power supply to a predetermined load. A switching control apparatus for controlling the thyristor or the TRIAC is driven by a control-purpose power supply, and applies or cuts off a gate current supplied from the commercial alternating current power supply to a gate terminal of the thyristor or the TRIAC, to thereby perform switching operation of the thyristor or the TRIAC.

For instance, Japanese Patent Application Laid-Open No. 2009-207241 proposes a thyristor gate drive circuit, in which a photocoupler is connected in parallel to the thyristor, and the thyristor and the photocoupler are controlled to be turned on and off alternately to each other. Thus, even when the control-purpose power supply does not work correctly, electric power can be supplied to a load connected to the commercial alternating current power supply.

However, in the related art described above, although the thyristor can be turned on even when electric power cannot be supplied from the control-purpose power supply to the thyristor gate drive circuit, lower power consumption that is required in recent years is not taken into consideration. It is because two photocouplers need to be turned on for maintaining the OFF state of the thyristor. In addition, a leakage current flowing from the commercial alternating current power supply to the load through the thyristor gate drive circuit when the thyristor is turned off cannot be neglected in order to achieve low power consumption.

SUMMARY OF THE INVENTION

In view of the background described above, a purpose of the present invention is to reduce power consumption of a gate drive circuit for driving a thyristor or a TRIAC.

Another purpose of the invention is to provide a switching control apparatus, which is provided between a commercial alternating current power supply and a load, for controlling a switch for supplying or cutting off electric power from the commercial alternating current power supply to the load, the switching control apparatus including a switching driving unit for turning on or off the switch, a control-purpose power supply for outputting electric power for controlling the switching driving unit, a power transmission unit provided between the switching driving unit and the control-purpose power supply, for supplying or cutting off electric power from the control-purpose power supply to the switching driving unit, and a control unit for controlling the power transmission unit, wherein the control unit controls the switching driving unit to turn on the switch during a period in which the electric power from the control-purpose power supply to the switching driving unit is cut off by the power transmission unit, and controls the switching driving unit to turn off the switch during a period in which the electric power is supplied from the control-purpose power supply to the switching driving unit.

A further purpose of the present invention is to provide an image forming apparatus, including an image forming unit for forming an image on a recording material, a switch for supplying or cutting off electric power from a commercial alternating current power supply to the image forming unit, and a switching driving unit for turning on or off the switch, a control-purpose power supply for outputting electric power for controlling the switching driving unit, a power transmission unit provided between the switching driving unit and the control-purpose power supply, for supplying or cutting off electric power from the control-purpose power supply to the switching driving unit, and a control unit for controlling the power transmission unit, wherein the control unit controls the switching driving unit to turn on the switch during a period in which the electric power from the control-purpose power supply to the switching driving unit is cut off by the power transmission unit, and controls the switching driving unit to turn off the switch during a period in which the electric power is supplied from the control-purpose power supply to the switching driving unit.

Further features of the present invention will become apparent from the following description of exemplary embodiments with reference to the attached drawings.

DESCRIPTION OF THE EMBODIMENTS

Now, exemplary embodiments of the present invention are described in detail with reference to the drawings.

First Embodiment

Structure of Switching Control Apparatus

Figure 1:
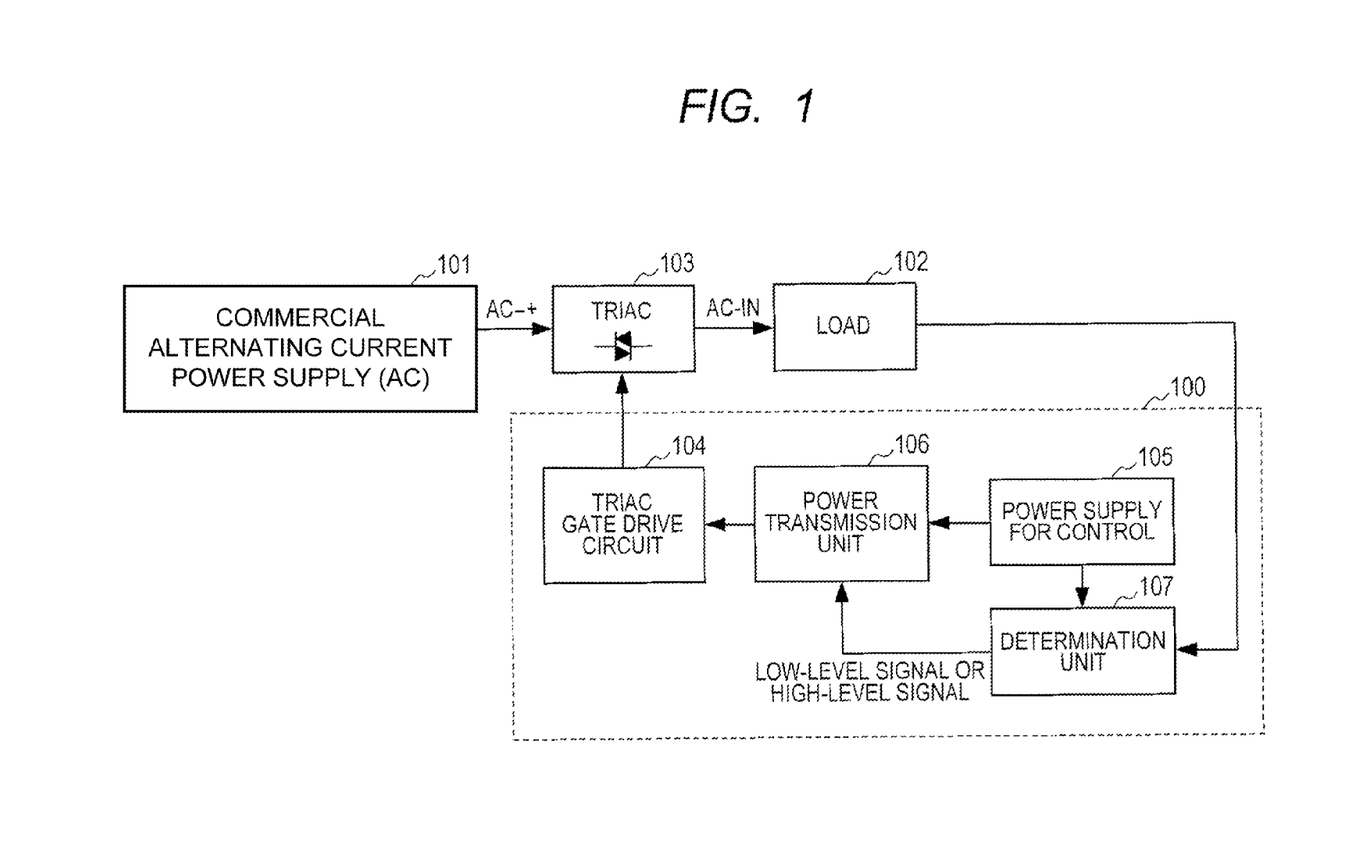
FIG. 1 is a block diagram illustrating a structure of a power supply apparatus according to a first embodiment of the present invention.

FIG. 1 illustrates a switching control apparatus 100 according to a first embodiment of the present invention. TRIAC 103 as a switching unit, a gate-controlled semiconductor switch, is provided between a commercial alternating current power supply (AC) 101 and a load 102 to be supplied with AC electric power from the commercial alternating current power supply (AC) 101. The switching control apparatus 100 controls ON and OFF of the TRIAC 103. The load 102 is, for example, an AC-DC converter for a power supply apparatus mounted in an image forming apparatus described later, and more specifically is an electrolytic capacitor having a capacitance of a few hundreds pF on a primary side of the power supply apparatus.

The switching control apparatus 100 includes a TRIAC gate drive circuit 104 as a switch driving unit, a control-purpose power supply 105, a power transmission unit 106, and a determination unit 107. The TRIAC gate drive circuit 104 applies or cuts off a gate current obtained by rectifying an AC current supplied from the commercial alternating current power supply 101 into a DC current to a gate terminal of the TRIAC 103, so as to control switching operation of the TRIAC 103. Note that, the gate terminal of the TRIAC 103 is referred to as a G terminal in the following description (see FIG. 2).

The TRIAC gate drive circuit 104 is connected via the power transmission unit 106 to the control-purpose power supply 105 that supplies electric power for controlling the TRIAC gate drive circuit 104. The power transmission unit 106 is connected to the determination unit 107 as a control unit for controlling the power transmission unit 106. The determination unit 107 is a CPU, for example, and is an engine controller in the image forming apparatus described later. The determination unit 107 outputs a low-level signal to the power transmission unit 106 when supplying the electric power from the control-purpose power supply 105 to the TRIAC gate drive circuit 104, and outputs a high-level signal to the power transmission unit 106 when cutting off the electric power.

The electric power for driving the determination unit 107 is supplied from the load 102 when the load 102 is operating, and is supplied from the control-purpose power supply 105 when the load 102 is stopped. This is because the determination unit 107 needs to be always in a driving state in order to switch the TRIAC 103 to the ON state even if the load 102 is stopped when a power switch of the image forming apparatus described later, for example, is operated for power-on operation in a state where the load 102 is stopped.

As the control-purpose power supply 105, a battery such as an alkaline battery having a relatively long life or a rechargeable battery is used, for example. When a rechargeable battery is used, the battery may be automatically charged by output power from the load 102 during a period in which the load 102 is operating. A voltage of the control-purpose power supply 105 is 3.3 V, for example. When electric power from the control-purpose power supply 105 is supplied to the TRIAC gate drive circuit 104 by the power transmission unit 106, the TRIAC gate drive circuit 104 cuts off the gate current supplied from the commercial alternating current power supply 101 to the G terminal of the TRIAC 103. In this way, the TRIAC gate drive circuit 104 cuts off electric power supplied from the commercial alternating current power supply 101 to the load 102. In addition, when electric power from the control-purpose power supply 105 is cut off by the power transmission unit 106, the TRIAC gate drive circuit 104 supplies the gate current to the G terminal of the TRIAC 103 from the commercial alternating current power supply 101. In this way, the TRIAC gate drive circuit 104 supplies electric power from the commercial alternating current power supply 101 to the load 102.

Figure 2:
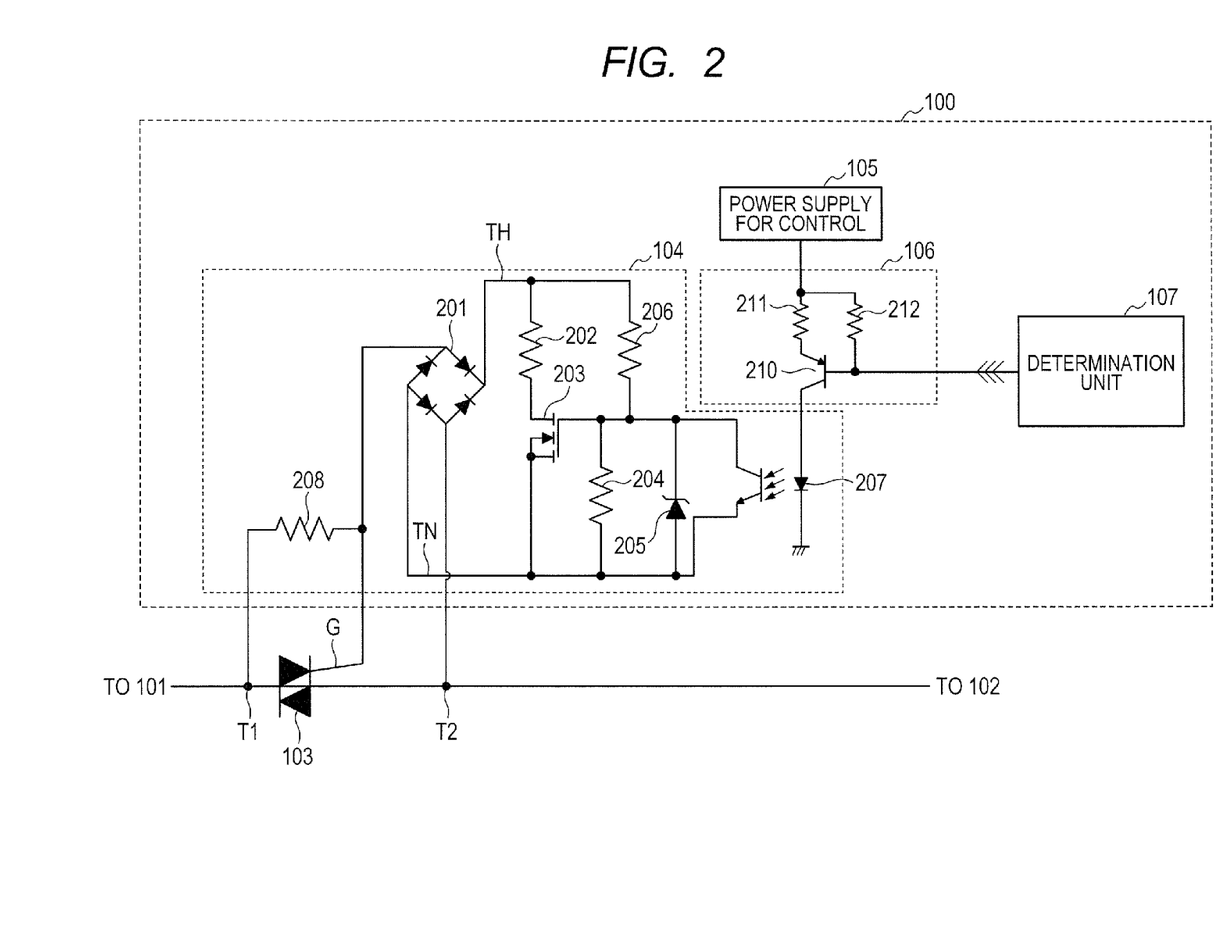
FIG. 2 is a diagram illustrating a structure of a TRIAC gate drive circuit according to the first embodiment.

In FIG. 2 illustrating the TRIAC gate drive circuit 104 and the power transmission unit 106 as specific circuits, a T1 terminal of the TRIAC 103 is connected to the commercial alternating current power supply 101, and a T2 terminal of the TRIAC 103 is connected to the load 102. A diode bridge rectifying circuit (hereinafter referred to as a diode bridge) 201 is connected between the T2 terminal and the G terminal of the TRIAC 103 so as to rectify the current supplied from the commercial alternating current power supply 101 via the load 102. The rectified current flows through a resistor 202 and a field-effect transistor (FET) 203 and is rectified by the diode bridge 201 again to flow into the G terminal of the TRIAC 103. A resistor 204 is connected in parallel between the gate and source of the FET 203, and the FET 203 becomes the ON state when a voltage applied to the resistor 204 becomes a gate cutoff voltage of the FET 203 or higher. A zener diode 205 is also connected in parallel between the gate and source of the FET 203, and has a role as a protection element for limiting a voltage applied between the gate and source of the FET 203 to be lower than a gate-source breakdown voltage of the FET 203. A resistor 206 is provided for applying a voltage that is obtained by subtracting the voltage applied between the gate and source of the FET 203 from a voltage rectified by the diode bridge 201.

A photocoupler 207 is connected in parallel between the gate and source of the FET 203. An anode of a light emitting diode of the photocoupler 207 is connected to a collector of a transistor 210, and a cathode of the light emitting diode is connected to the ground. The light emitting diode of the photocoupler 207 emits light when the transistor 210 is turned on, and is turned off when the transistor 210 is turned off. When the light emitting diode of the photocoupler 207 is turned off, a phototransistor of the photocoupler 207 becomes the OFF state so that conduction between the gate and source of the FET 203 becomes an open state. Therefore, as described above, the FET 203 becomes the ON state when the voltage applied to the resistor 204 becomes a predetermined value or higher. When the FET 203 becomes the ON state, the current supplied from the commercial alternating current power supply 101 via the load 102 flows into the G terminal of the TRIAC 103 via the FET 203. Therefore, conduction between the T1 terminal and the T2 terminal of the TRIAC 103 is established. On the other hand, when the light emitting diode of the photocoupler 207 is turned on, the phototransistor of the photocoupler 207 becomes the ON state so that conduction between the gate and source of the FET 203 becomes a short state. Therefore, a voltage is not applied to the resistor 204 so that the FET 203 is always in the OFF state. If the FET 203 is always in the OFF state, a gate current necessary for conduction between the T1 terminal and the T2 terminal of the TRIAC 103 cannot be supplied to the G terminal, and hence conduction between the T1 terminal and the T2 terminal of the TRIAC 103 is cut off (non-conductive state). A resistor 208 is provided between the T1 terminal and the G terminal of the TRIAC 103.

The power transmission unit 106 includes the transistor 210, a current limiting resistor 211, and a base-emitter resistor 212. An emitter of the transistor 210 is connected to the control-purpose power supply 105 via the current limiting resistor 211, a collector of the transistor 210 is connected to the anode of the light emitting diode of the photocoupler 207, and a base of the transistor 210 is connected to the determination unit 107. When the power transmission unit 106 receives the high-level signal from the determination unit 107, the transistor 210 is turned off so that the current supplied from the control-purpose power supply 105 is not supplied to the light emitting diode of the photocoupler 207. Therefore, the light emitting diode of the photocoupler 207 is turned off. Therefore, as described above, conduction between the T1 terminal and the T2 terminal of the TRIAC 103 is established. On the other hand, when the power transmission unit 106 receives the low-level signal from the determination unit 107, the transistor 210 is turned on so that the current supplied from the control-purpose power supply 105 is supplied to the light emitting diode of the photocoupler 207 via the current limiting resistor 211. In this way, the light emitting diode of the photocoupler 207 is turned on so that conduction between the T1 terminal and the T2 terminal of the TRIAC 103 is cut off.

Operation Waveform of Switching Control Apparatus

Figure 3A:
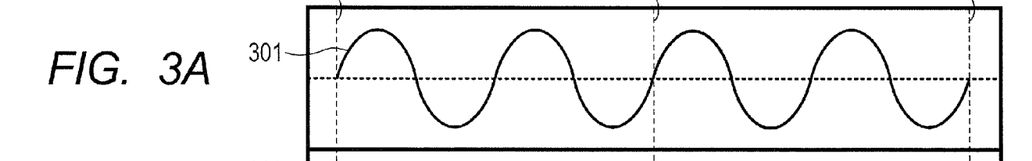
FIGS. 3A, 3B, 3C, 3D, and 3E are graphs showing operation of the TRIAC gate drive circuit according to the first embodiment.
Figure 3B:
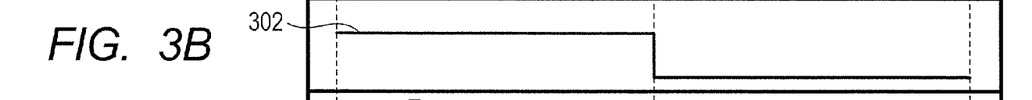
Figure 3C:
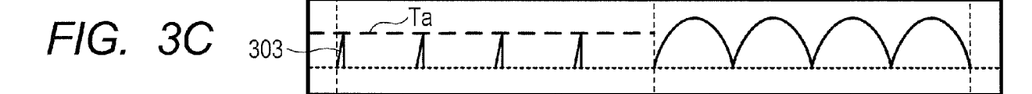
Figure 3D:
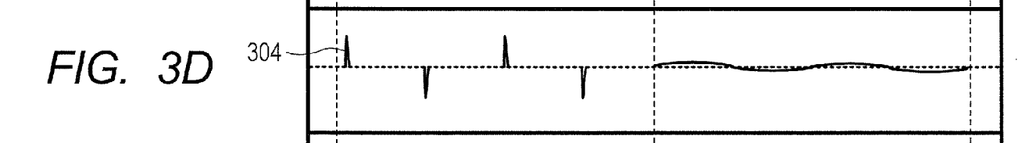
Figure 3E:
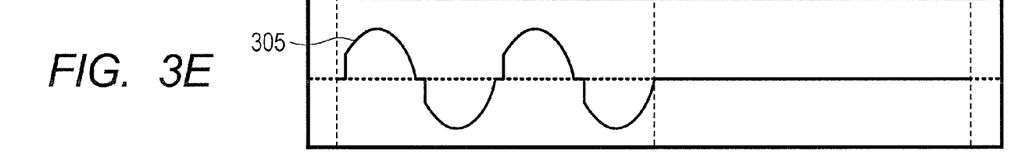

In FIGS. 3A to 3E showing waveforms of operation of the switching control apparatus 100 and the TRIAC 103 illustrated in FIG. 2, a description is first given of each waveform operation from a predetermined time point T41 to a time point T42 that is a timing at which power supply to the load 102 is cut off. Here, FIG. 3A shows a sine voltage waveform 301 output from the commercial alternating current power supply 101. Note that, a waveform of the current flowing in the load 102 is also the same sine wave as the waveform 301. FIG. 3B shows a waveform 302 of a signal output from the determination unit 107 to the power transmission unit 106. FIG. 3C shows a TH-TN voltage waveform 303 after being rectified by the diode bridge 201. FIG. 3D shows a waveform 304 of the current flowing in the G terminal of the TRIAC 103. FIG. 3E shows a waveform 305 of the current flowing between the T1 terminal and the T2 terminal of the TRIAC 103.

The sine voltage waveform 301 (FIG. 3A) output from the commercial alternating current power supply 101 is output to the T2 terminal of the TRIAC 103 via the load 102. The waveform 302 output to the power transmission unit 106 from the determination unit 107 has a high level from the time point T41 to the time point T42 as shown in FIG. 3B. As a result, the transistor 210 of the power transmission unit 106 is in the OFF state. When the transistor 210 is in the OFF state, electric power is not supplied from the control-purpose power supply 105 to the photocoupler 207 of the TRIAC gate drive circuit 104. Therefore, the phototransistor of the photocoupler 207 becomes the OFF state so that conduction between the gate and source of the FET 203 does not become a short state. As a result, the FET 203 becomes the ON state when the voltage between the gate and the source becomes a predetermined value or higher.

In FIG. 3C showing the TH-TN voltage waveform 303 after being rectified by the diode bridge 201 (see FIG. 2), when the TH-TN voltage becomes a predetermined voltage Ta (shown in FIG. 3C by the broken line) or higher, the voltage between the gate and source of the FET 203 becomes a predetermined value or higher. Therefore, the FET 203 becomes the ON state so that the gate current flows into the G terminal of the TRIAC 103 as shown in FIG. 3D by the waveform 304. As a result, conduction between the T1 terminal and the T2 terminal of the TRIAC 103 is established as shown in FIG. 3E by the waveform 305, and hence a current starts to flow from the commercial alternating current power supply 101 to the load 102. When the conduction between the T1 terminal and the T2 terminal of the TRIAC 103 is established, a voltage is not applied between the T2 terminal and the G terminal of the TRIAC 103. Therefore, in the period in which the conduction between the T1 terminal and the T2 terminal is established in the waveform 303, the TH-TN voltage falls to be close to 0 V.

As shown by the waveform 304, after the conduction between the T1 terminal and the T2 terminal of the TRIAC 103 is established, a current does not flow into the G terminal until the conduction is cut off. As shown by the waveform 305, once the TRIAC 103 becomes conductive, the TRIAC 103 maintains the conductive state until the next zero cross (at a time point when the polarity of the waveform 301 is inverted).

Here, the current flowing between the T1 terminal and the T2 terminal of the TRIAC 103 does not have a strict sine waveform as shown by the waveform 305. When the current flowing between the T1 terminal and the T2 terminal of the TRIAC 103 does not have a sine waveform, a rush current (that is much larger than a current in a steady state) into the load 102 (for example, electrolytic capacitor) increases and causes noise or harmonics. Therefore, in order to make the current flowing between the T1 terminal and the T2 terminal of the TRIAC 103 have a waveform close to a sine waveform, a resistance ratio corresponding to the resistor 206 and the resistor 204 is adjusted so as to increase a ratio of the voltage applied to the resistor 204 to the voltage applied between TH and TN. In addition, by using an FET having a low on-voltage, it is possible to cause a current having a waveform closer to a sine waveform to flow.

Next, each waveform operation from the time point T42 to a predetermined time point T43 is described. As shown by the waveform 302, the signal output to the power transmission unit 106 has a low level from the time point T42 to the time point T43. Therefore, the transistor 210 of the power transmission unit 106 is turned on. When the transistor 210 is turned on, electric power is supplied from the control-purpose power supply 105 to the photocoupler 207 of the TRIAC gate drive circuit 104. Therefore, the phototransistor of the photocoupler 207 becomes the ON state, and conduction between the gate and source of the FET 203 becomes a short state. As a result, the FET 203 becomes the OFF state.

When the FET 203 becomes the OFF state, as shown by the waveform 303, the TH-TN voltage is a voltage after the waveform 301 is supplied to the T2 terminal of the TRIAC 103 via the load 102 and rectified by the diode bridge 201. The TH-TN voltage is applied to the resistor 206 and the resistor 204. Here, because conduction between the gate and source of the FET 203 is in a short state due to the photocoupler 207, the voltage applied to the resistor 204 is substantially 0 V.

As shown by the waveform 304, the current flowing in the G terminal of the TRIAC 103 is determined by the TH-TN voltage indicated by the waveform 303 and the impedance of the resistor 206. Therefore, power consumption from the time point T42 to the time point T43 is electric power consumed mainly by the resistor 206. In order to reduce the power consumption as much as possible, it is necessary to set the impedance of the resistor 206 to approximately a few MΩ. Because the TRIAC gate drive circuit 104 of this embodiment has a feature of voltage drive using the FET 203, it is possible to set the resistor 206 to have high impedance. As shown by the waveform 305, substantially no current flows between the T1 terminal and the T2 terminal of the TRIAC 103 because conduction between the T1 terminal and the T2 terminal of the TRIAC is cut off from the time point T42 to the time point T43.

As described above, according to this embodiment, the TRIAC gate drive circuit 104 is configured so that conduction between the T1 terminal and the T2 terminal of the TRIAC 103 is established when the electric power from the control-purpose power supply 105 to the TRIAC gate drive circuit 104 is cut off. In this way, even if the light emitting diode of the photocoupler 207 is turned off, electric power can be supplied from the commercial alternating current power supply 101 to the load 102 via the TRIAC 103. In addition, because the single photocoupler 207 drives the TRIAC 103 in the TRIAC gate drive circuit 104, electric power consumed in the TRIAC gate drive circuit 104 can be reduced. Further, because the TRIAC gate drive circuit 104 includes the resistor 206 having high impedance, power consumption can be reduced when conduction between the T1 terminal and the T2 terminal of the TRIAC 103 is cut off.

According to the embodiment described above, power consumption of the gate drive circuit for driving the thyristor or the TRIAC can be reduced.

Second Embodiment

Figure 4:
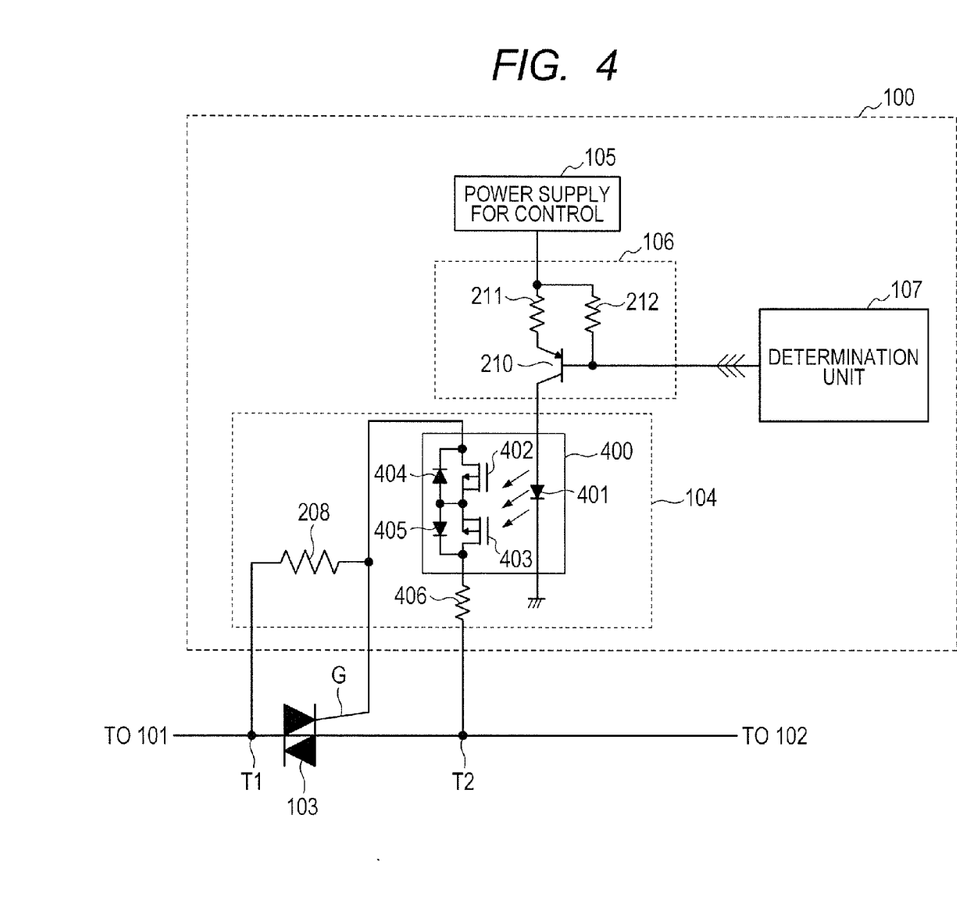
FIG. 4 is a diagram illustrating details of a circuit structure according to a second embodiment of the present invention.

In FIG. 4 illustrating a second embodiment of the present invention, the second embodiment is different from the first embodiment in the structure of the TRIAC gate drive circuit 104. In the second embodiment, the circuit structures and relationship of the control-purpose power supply 105, the power transmission unit 106, and the determination unit 107 constructing the switching control apparatus 100 are the same as those of the first embodiment, and hence description thereof is omitted.

A normally-on type photoMOS relay 400 is connected between the T2 terminal and the G terminal of the TRIAC 103. In the photoMOS relay 400, when an internal light emitting diode 401 does not emit light, FETs 402 and 403 become the ON state, and an AC current can flow via diodes 404 and 405 connected in anti-series. In this way, conduction between the T2 terminal and the G terminal of the TRIAC 103 is established. In other words, when the determination unit 107 outputs a high-level signal to the power transmission unit 106 so that the transistor 210 becomes the OFF state, the current from the control-purpose power supply 105 is not supplied to the light emitting diode 401 of the photoMOS relay 400. In this case, conduction between the T2 terminal and the G terminal of the TRIAC 103 is established, and hence conduction between the T1 terminal and the T2 terminal of the TRIAC 103 is established.

When the determination unit 107 outputs a low-level signal to the power transmission unit 106 so that the transistor 210 becomes the ON state, the current from the control-purpose power supply 105 is supplied to the light emitting diode 401 of the photoMOS relay 400. In this case, because the light emitting diode 401 emits light, the FETs 402 and 403 become the OFF state. In this way, because no AC current flows in the diodes 404 and 405, conduction between the T2 terminal and the G terminal of the TRIAC 103 is cut off, and hence conduction between the T1 terminal and the T2 terminal of the TRIAC 103 is cut off.

Because the TRIAC gate drive circuit 104 includes only one light emitting diode 401 of the photoMOS relay 400, electric power supplied from the control-purpose power supply 105 can be reduced similarly to the first embodiment. In addition, power consumption of when conduction between the T1 terminal and the T2 terminal of the TRIAC 103 is cut off can be reduced, because the FETs 402 and 403 are cut off, and hence low power consumption can be realized.

As described above, according to this embodiment, the TRIAC gate drive circuit 104 is configured so that conduction between the T1 terminal and the T2 terminal of the TRIAC 103 is established when the electric power from the control-purpose power supply 105 to the TRIAC gate drive circuit 104 is cut off. In this way, electric power can be supplied from the commercial alternating current power supply 101 to the load 102 via the TRIAC 103. In addition, in the TRIAC gate drive circuit 104, because the single photoMOS relay 400 (single light emitting diode) drives the TRIAC 103 similarly to the first embodiment, electric power supplied from the control-purpose power supply 105 can be reduced. Further, power consumption of when conduction between the T1 terminal and the T2 terminal of the TRIAC 103 is cut off can be reduced, because a leakage current is cut off by the photoMOS relay 400, and hence low power consumption can be realized.

According to the embodiment described above, power consumption of the gate drive circuit for driving the thyristor or the TRIAC can be reduced.

Third Embodiment

The switching control apparatus 100 described above in the first and second embodiments can be applied to control of, for example, a low voltage power supply of an image forming apparatus, namely a power supply (load) for supplying electric power to a drive portion such as an engine controller (determination unit) and a motor. A structure of the image forming apparatus to which the switching control apparatus 100 of the first or second embodiment is applied is described below.

Structure of Image Forming Apparatus

Figure 5:
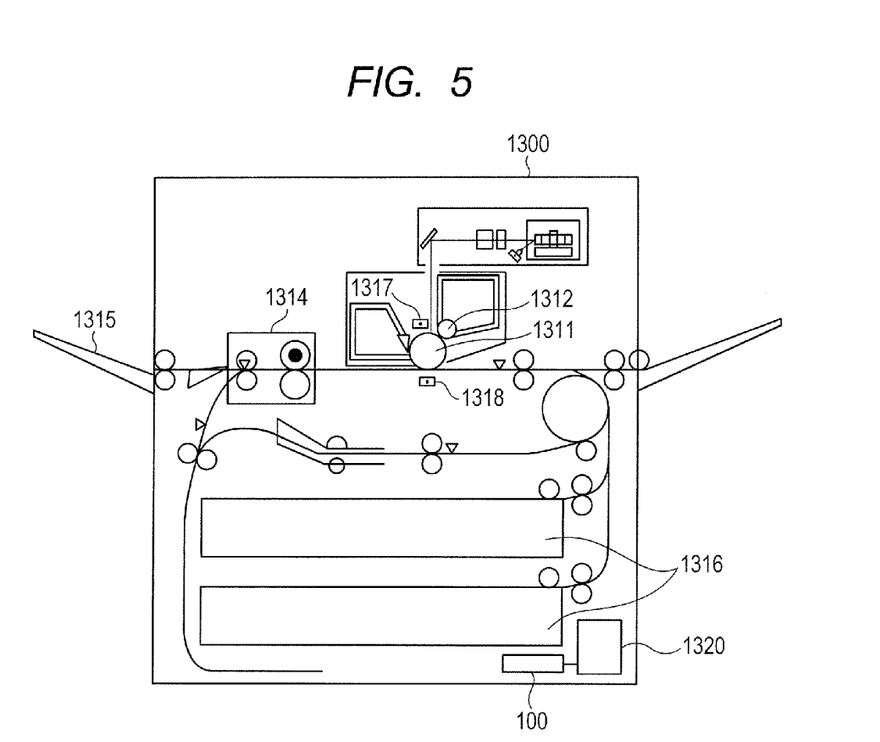
FIG. 5 is a diagram illustrating an image forming apparatus according to a third embodiment of the present invention.

As an example of the image forming apparatus, a laser beam printer is exemplified. FIG. 5 illustrates a schematic structure of the laser beam printer as an example of an electrophotographic printer. A laser beam printer 1300 includes a photosensitive drum 1311 as an image bearing member on which an electrostatic latent image is to be formed, a charging portion 1317 for uniformly charging the photosensitive drum 1311, and a developing portion 1312 for developing an electrostatic latent image formed on the photosensitive drum 1311 with toner. Further, a toner image developed on the photosensitive drum 1311 is transferred onto a sheet (not shown) as a recording material supplied from a cassette 1316 by a transferring portion 1318, and the toner image transferred onto the sheet is fixed by a fixing unit 1314 and is discharged onto a tray 1315. The photosensitive drum 1311, the charging portion 1317, the developing portion 1312, and the transferring portion 1318 serve as an image forming unit.

The laser beam printer 1300 includes the switching control apparatus 100 described above in the first and second embodiments, and controls ON and OFF of a power supply apparatus 1320 corresponding to the load 102 described above in the first and second embodiments. Note that, the image forming apparatus to which the switching control apparatus 100 of the first or second embodiment can be applied may be an image forming apparatus including multiple of image forming units without limited to the one illustrated in FIG. 5. Further, the image forming apparatus may include a primary transferring portion for transferring the toner image on the photosensitive drum 1311 onto an intermediate transfer belt and a secondary transferring portion for transferring the toner image on the intermediate transfer belt onto the sheet.

The image forming apparatus has a normal mode and a power saving mode. The normal mode is a mode for performing the image forming operation. The power saving mode is a mode for reducing power consumption by supplying electric power from the power supply apparatus 1320 only to the engine controller when the image forming operation is not performed. In addition, the image forming apparatus of this embodiment has a mode for further reducing power consumption by stopping power supply to the power supply apparatus 1320 by the switching control apparatus 100.

As described above, according to this embodiment, in the switching control apparatus for controlling the power supply apparatus of the image forming apparatus, power consumption of the gate drive circuit for driving the thyristor or the TRIAC can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In addition, it is effective to apply the switching control apparatus into an apparatus to control the power supplied into the fixing unit 1314 of an image forming apparatus. The power supplied into the fixing unit 1314 can be controlled by the switching control apparatus to control the temperature of the fixing device 1314.

This application claims the benefit of Japanese Patent Application No. 2013-105116, filed May 17, 2013, which is hereby incorporated by reference herein in its entirety.

What is claimed is:

1. A switching control apparatus, which is provided between a commercial alternating current power supply and a load, for controlling a switch for supplying or cutting off electric power from the commercial alternating current power supply to the load, the switching control apparatus comprising:
   a switching driving unit for turning on or off the switch;
   a control-purpose power supply for outputting electric power for controlling the switching driving unit;
   a power transmission unit provided between the switching driving unit and the control-purpose power supply, for supplying or cutting off electric power from the control-purpose power supply to the switching driving unit; and
   a control unit for controlling the power transmission unit, wherein the control unit controls the switching driving unit to turn on the switch during a period in which the electric power from the control-purpose power supply to the switching driving unit is cut off by the power transmission unit, and controls the switching driving unit to turn off the switch during a period in which the electric power is supplied from the control-purpose power supply to the switching driving unit.

2. A switching control apparatus according to claim 1, wherein the switch includes a gate-controlled semiconductor switch; and
   the switching driving unit applies a gate current to a gate terminal of the gate-controlled semiconductor switch when the electric power from the control-purpose power supply is cut off by the power transmission unit, and stops the application of the gate current to the gate terminal of the gate-controlled semiconductor switch when the electric power is supplied from the control-purpose power supply by the power transmission unit.

3. A switching control apparatus according to claim 2, wherein the switching driving unit includes a photocoupler; and
   the photocoupler includes a light emitting diode, which is turned on when the electric power is supplied from the control-purpose power supply by the power transmission unit, and is turned off when the electric power from the control-purpose power supply is cut off by the power transmission unit.

4. A switching control apparatus according to claim 3, wherein the switching driving unit includes an FET; and
   the FET is turned on to apply a gate current to the gate terminal of the gate-controlled semiconductor switch when the light emitting diode of the photocoupler is turned off, and is turned off to stop the application of the gate current to the gate terminal of the gate-controlled semiconductor switch when the light emitting diode of the photocoupler is turned on.

5. A switching control apparatus according to claim 4, wherein the power transmission unit includes a transistor; and
   the transistor includes an emitter connected to the control-purpose power supply, a collector connected to an anode of the light emitting diode of the photocoupler, and a base connected to the control unit.

6. A switching control apparatus according to claim 5, wherein the photocoupler includes a phototransistor, the phototransistor including a collector connected to a gate of the FET and an emitter connected to a source of the FET.

7. A switching control apparatus according to claim 4, wherein the photocoupler includes a phototransistor, the phototransistor including a collector connected to a gate of the FET and an emitter connected to a source of the FET.

8. A switching control apparatus according to claim 4, further comprising a diode bridge rectifying circuit connected between the gate terminal of the gate-controlled semiconductor switch and a terminal of the gate-controlled semiconductor switch connected to the load.

9. A switching control apparatus according to claim 3, wherein the power transmission unit includes a transistor; and
   the transistor includes an emitter connected to the control-purpose power supply, a collector connected to an anode of the light emitting diode of the photocoupler, and a base connected to the control unit.

10. A switching control apparatus according to claim 9, wherein the transistor is turned off when a high-level signal is supplied to the base from the control unit and is turned on when a low-level signal is supplied to the base from the control unit.

11. A switching control apparatus according to claim 10, wherein the anode of the light emitting diode of the photocoupler is connected to the collector of the transistor, while a cathode of the light emitting diode is connected to a ground; and
    the light emitting diode emits light when the transistor is turned on, and the light emitting diode is turned off when the transistor is turned off.

12. A switching control apparatus according to claim 9, wherein the photocoupler includes a phototransistor, the phototransistor including a collector connected to a gate of the FET and an emitter connected to a source of the FET.

13. A switching control apparatus according to claim 3, further comprising a diode bridge rectifying circuit connected between the gate terminal of the gate-controlled semiconductor switch and a terminal of the gate-controlled semiconductor switch connected to the load.

14. A switching control apparatus according to claim 2, wherein the switching driving unit includes a photoMOS relay including a light emitting diode; and
    the photoMOS relay is turned on to apply a gate current to the gate terminal of the gate-controlled semiconductor switch when the light emitting diode is turned off, and is turned off to stop the application of the gate current to the gate terminal of the gate-controlled semiconductor switch when the light emitting diode is turned on.

15. A switching control apparatus according to claim 14, wherein the photocoupler includes a phototransistor, the phototransistor including a collector connected to a gate of the FET and an emitter connected to a source of the FET.

16. A switching control apparatus according to claim 14, wherein the power transmission unit includes a transistor; and
    the transistor includes an emitter connected to the control-purpose power supply, a collector connected to an anode of the light emitting diode of the photocoupler, and a base connected to the control unit.

17. A switching control apparatus according to claim 16, wherein the photocoupler includes a phototransistor, the phototransistor including a collector connected to a gate of the FET and an emitter connected to a source of the FET.

18. A switching control apparatus according to claim 2, further comprising a diode bridge rectifying circuit connected between the gate terminal of the gate-controlled semiconductor switch and a terminal of the gate-controlled semiconductor switch connected to the load.

19. An image forming apparatus, comprising:
    a switch for supplying or cutting off electric power from a commercial alternating current power supply to the image forming apparatus; and a switching control unit for controlling operation of the switch, wherein the switching control unit comprises:

a switching driving unit for turning on or off the switch;

a control-purpose power supply for outputting electric power for controlling the switching driving unit;

a power transmission unit provided between the switching driving unit and the control-purpose power supply, for supplying or cutting off electric power from the control-purpose power supply to the switching driving unit; and a control unit for controlling the power transmission unit, wherein the control unit controls the switching driving unit to turn on the switch during a period in which the electric power from the control-purpose power supply to the switching driving unit is cut off by the power transmission unit, and controls the switching driving unit to turn off the switch during a period in which the electric power is supplied from the control-purpose power supply to the switching driving unit.

20. The image forming apparatus according to claim 19, further comprising a fixing unit for fixing an image on a recording material, wherein the switching control unit controls an operation of the switch to control power supplied into the fixing unit.

* * * * *